_United States Patent Office_

3,784,534
Patented Jan. 8, 1974

3,784,534
YELLOW SULFUR DYES
Satosi Yosioka, Sinobu Tokunaga, Tomoyoshi Tamenori, and Sigeru Tamura, Fukuyama, and Morio Wada, Hiroshima-ken, Japan, assignors to Nippon Kayaku Co., Ltd., Tokyo, Japan
No Drawing. Filed Feb. 24, 1972, Ser. No. 229,192
Claims priority, application Japan, Feb. 26, 1971, 46/9,309
Int. Cl. C09b 49/00
U.S. Cl. 260—128    4 Claims

ABSTRACT OF THE DISCLOSURE

This invention relates to clear and pure yellow sulfur dyes, which can be obtained by blending the compounds represented by the following Formulas I, II, and III with an optional blending ratio and sulfurizing:

$$CH_3 \underset{N}{\overset{S}{\bigcirc}} C \bigcirc NH_2 \quad (I)$$

$$\underset{NHCHO}{\bigcirc} \underset{NHCHO}{\bigcirc} \quad (II)$$

$$\underset{X}{\bigcirc}{}^{4\,3}_{5\,6}{}^{2}_{1} - S - S - \underset{X}{\bigcirc}{}^{2\,3}_{6\,5}{}^{4}_{1} \quad (III)$$

(in the Formula III X is a amino, nitro, or formylamino radical substituted at 2,2' or 4,4').

BACKGROUND OF THE INVENTION

There are many literatures as to yellow sulfur dyes and many products are available commercially, but Sulfur Yellow GG (Color Index No. 53160, Field Intelligence Agency Technical Report 1068) is only one clear and pure yellow sulfur dye. However, said dye has the following defects:
(1) Benzidine which is remarkably harmful and difficult to handle is used as a raw material,
(2) The solubility of the product is low, and
(3) The light fastness is poor [Grade 2-4 (JIS)].

SUMMARY

The present inventors have studied as considering these defects and improved them: that is, the reduction solubility of the dye is highly improved by introducing disulfide bondage into the dye structure. Consequently the dye can be well used for mechanical dyeing including package dyeing and wince dyeing, as well as general dyeing for the dye include no unsoluble compound. As the dye of this invention can be used in hydrosulfite vatting, it can be used in a wide range of application. The dye is also supperior in the light fastness to Sulfur Yellow GG dyes, and there can be cheaply produced a clear and pure yellow dye being valuable industrially. It is particularly noticeable that the dye does not use benzidine as a raw material.

DETAILED DESCRIPTION OF THE INVENTION

The dye of this invention is produced by blending the compounds represented by the above-described Formulae I, II, and III width an optional ratio, preferably with the blending ratio of 10 parts of the Compound I, 4-8 parts of the Compound II, and 5-9 parts of the Compound III and sulfurizing with a sulfurizing agent by a conventional process. The sulfurizing temperature is from 220° C. to 260° C., preferably from 240° C. to 250° C. Usually sulfur and sodium sulfide are used as sulfurizing agent. It is preferable to use sulfur in the amount of 5-8 parts per 1 part of dehydrothioparatoluidine, and in the Compound III, when X=$NO_2$, sodium sulfide necessary for reducing the $NO_2$ radical is of course added beside sulfur, and its amount is preferably 1-2 parts of 46% sodium sulfide per 1 part of the Compound III.

The dye thus produced is excellent as seen in the following table.

| Raw material | Blending ratio | Properties of the dye |
|---|---|---|
| (I) | | Hue: red, dirty. Reduction solubility: very poor (unvalued as a dye). |
| (I)+(II) | (I) 10 parts<br>(II) 5 parts | Hue: clear, pure yellow.<br>Dyed material: changed with time.<br>Washing fastness: poor [Grade 1-2- (JIS)] (unvalued as a dye). |
| (I)+(III) | (I) 10 parts<br>(III) 5 parts | Solubility: excellent.<br>Exhaustion: poor.<br>Fastness: good (unvalued as a dye). |
| (I)+(II)+(III) | (I) 10 parts<br>(II) 5 parts<br>(III) 5 parts | Clear and pure yellow dye.<br>Solubility: excellent.<br>Exhaustion: excellent.<br>Fastness: good light fastness; Grade 3 (JIS) washing fastness; cotton, Grad 4 4 (JIS) wool, Grade 4-5 (JIS) (valuable as a dye). |

According to this invention, a great synergism is obtained by blending and sulfurizing three compounds, as using a novel Compound III.

Some examples are shown below, in which parts are by weight.

EXAMPLE 1

Into a sulfurizing kettle, 8 parts of dehydrothioparatoluidine, 4 parts of diformylparamine, 4 parts of 2,2'-diaminodiphenyl disulfide, and 50 parts of sulfur were charged; the mixture was heated up to 240-250° C. as agitating, and kept at the temperature for three hours. After sulfurizing, the product was cooled and taken out: there were obtained 55 parts of brownish powder (crude dye). To 15 parts of the crude dye, 15 parts of caustic soda and 110 parts of water were added, heated and treated at the boiling point (105-102° C.) for about 1 hour. The dye was precipitated by a conventional process (air-oxidation precipitation or acid precipitation), filtered, water-washed and dried to obtain 9 parts of refined dye. The dye was well soluble in sodium sulfide solution, had light fastness higher than conventional Sulfur Yellow GG, that is, Grade 3-4 (JIS), and dyed cotton and staple fibres to be clear and pure yellow with a high concentration.

EXAMPLE 2

Into a sulfurizing kettle, 8.8 parts of 46% sodium sulfide, 26 parts of water, 4 parts of sulfur, and 4.4 parts of 2,2'-dinitrodiphenyl disulfide were charged, and after heating, 4 parts of diformylparamine, 8 parts of dehydrothioparatoluidine, and 46 parts of sulfur were added, and similarly treated as described in Example 1; thus, there were obtained 8 parts of a pure yellow dye from 15 parts of the crude dye. The properties of the dye were almost similar to those of the product obtained in Example 1.

EXAMPLE 3

Into a sulfurizing kettle, 8 parts of dehydrothioparatoluidine, 4 parts of diformylparamine, 4.5 parts of 2,2'-diformylaminodiphenyl disulfide, and 55 parts of sulfur were charged and heated up to 230-240° C. as agitating; the mixture was kept at the temperature for 4 hours. After sulfurizing, the product was cooled and taken out to obtain 57 parts of a crude dye.

The crude dye has a good solubility and can be used as a dye as it is, and may be refined, if necessary, according to Example 1.

(8 parts of refined dye are obtained from 15 parts of the crude dye.)

EXAMPLE 4

Into a sulfurizing kettle, 8 parts of dehydrothioparatoluidine, 4 parts of diformylparamine, 4 parts of 4,4'-diaminodiphenyl disulfide, and 50 parts of sulfur were charged, and heated up to 245-250° C. as agitating; the mixture was kept at the temperature for 3-4 hours. After sulfurizing, the product was cooled and taken out to obtain 56 parts of brown powder. 8 parts of refined dye were obtained from 15 parts of the crude dye by the same treatment as described in Example 1.

The resulting dye well dissolves in sodium sulfide solution, and dyes cotton and staple fibres to be clear and pure yellow.

We claim:

1. The dye produced by blending the compounds represented by the following Formulae I, II and III:

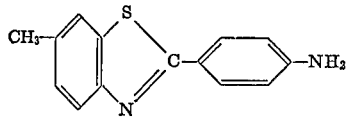

(I)

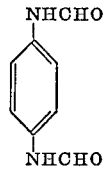

(II)

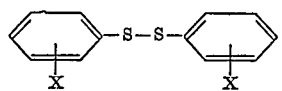

(III)

wherein X is a nitro, amino or formyl amino radical substituted at 2,2' or 4,4', in the ratio of (I):(II):(III)=10:4-8:5-9 provided that when X is a nitro radical, the compound represented by Formula III is reduced with sodium sulfide, and sulfurizing with sulfur or sulfur and sodium sulfide at 220 to 260° C.

2. The dye of claim 1, wherein X is nitro radical.
3. The dye of claim 1, wherein X is amino radical.
4. The dye of claim 1, wherein X is formylamino radical.

References Cited

UNITED STATES PATENTS

| 2,044,868 | 6/1936 | Zerweck | 260—128 |
| 892,455 | 7/1908 | Schmidt | 260—128 |
| 750,113 | 7/1904 | Lüttringhaus | 260—128 |
| 796,514 | 8/1905 | Hoerlin | 260—128 |

LEWIS GOTTS, Primary Examiner

D. R. PHILLIPS, Assistant Examiner

U.S. Cl. X.R.

8—28, 37; 260—125, 132, 133